United States Patent
Schmitt

(10) Patent No.: US 8,459,906 B1
(45) Date of Patent: Jun. 11, 2013

(54) HOLE POSITIONING SYSTEM

(76) Inventor: Arthur Rex Schmitt, Birnamwood, WI (US)

( * ) Notice: Subject to any disclaimer, the term of this patent is extended or adjusted under 35 U.S.C. 154(b) by 0 days.

(21) Appl. No.: 13/362,517

(22) Filed: Jan. 31, 2012

(51) Int. Cl.
*B23B 47/28* (2006.01)

(52) U.S. Cl.
USPC .................. 408/97; 408/103; 408/115 R

(58) Field of Classification Search
USPC ............ 408/95, 97, 98, 103, 115 R; 409/178, 409/205, 225
IPC .......................................... B23B 47/28
See application file for complete search history.

(56) References Cited

U.S. PATENT DOCUMENTS

| | | | | |
|---|---|---|---|---|
| 1,917,668 A * | 7/1933 | Smith | ............................. | 408/97 |
| 2,342,059 A * | 2/1944 | Moss | ............................... | 408/97 |
| 2,374,874 A * | 5/1945 | McKee | ........................... | 408/88 |
| 2,560,382 A * | 7/1951 | Barr | ................................ | 408/97 |
| 2,814,218 A * | 11/1957 | Lee | .................................. | 408/97 |
| 3,256,761 A * | 6/1966 | Huntley | .......................... | 83/412 |
| 3,465,620 A * | 9/1969 | Hilburn | ..................... | 408/115 R |
| 3,841,368 A * | 10/1974 | Ritter | ......................... | 144/136.1 |
| 4,114,664 A * | 9/1978 | Cotton | ........................ | 144/154.5 |
| 4,128,118 A * | 12/1978 | Ede | ............................ | 144/253.1 |
| 4,382,728 A * | 5/1983 | Anderson et al. | ............. | 409/137 |
| 4,480,364 A * | 11/1984 | Kosmowski | ................... | 29/56.6 |
| 4,615,654 A * | 10/1986 | Shaw | ............................. | 409/178 |
| 4,977,938 A * | 12/1990 | Greeson | ...................... | 144/154.5 |
| 5,056,966 A * | 10/1991 | Lee | .............................. | 408/115 R |
| 5,507,607 A * | 4/1996 | Ericksen et al. | .............. | 408/108 |
| 5,813,807 A * | 9/1998 | Rogers | .......................... | 409/178 |
| 5,853,270 A * | 12/1998 | Salley et al. | .................... | 408/87 |
| 6,524,033 B1 * | 2/2003 | Sykes | .......................... | 408/1 R |
| 6,884,010 B1 * | 4/2005 | Hosier et al. | .................. | 409/182 |
| 7,007,731 B2 * | 3/2006 | Chiu et al. | ..................... | 144/372 |
| 7,507,060 B2 * | 3/2009 | Grisley | ......................... | 409/137 |
| 7,631,674 B2 * | 12/2009 | Chang | ........................ | 144/286.5 |
| 7,726,916 B2 * | 6/2010 | MacKenzie Turner et al. | | 408/97 |
| 8,100,611 B2 * | 1/2012 | Buttrick et al. | .............. | 408/1 R |
| 8,219,163 B2 * | 7/2012 | Peng et al. | ................. | 455/575.4 |
| 2006/0210367 A1 * | 9/2006 | Liu | .......................... | 408/115 R |

* cited by examiner

*Primary Examiner* — Eric A Gates

(57) ABSTRACT

A panel face drilling system using a plunge router wherein an attached guide assembly in conjunction with a guide rail registered to a dual position work holding fixture provides tool guiding means to repeatably drill hole patterns within an array of perpendicular columns and rows. The column and row positions are fixed in relation to the work holding fixture. Nonstandard hole positions are obtainable through use of spacers. The work holding fixture is configured to allow loading of two work pieces at a time each to be aligned against a fence, positioned against a stop, constrained by a resilient clamping means, ready for drilling. By referencing the hole position number sets marked on the tool guiding means one can quickly drill required holes in one panel and then drill a mirror image of that hole pattern in a second panel.

1 Claim, 17 Drawing Sheets

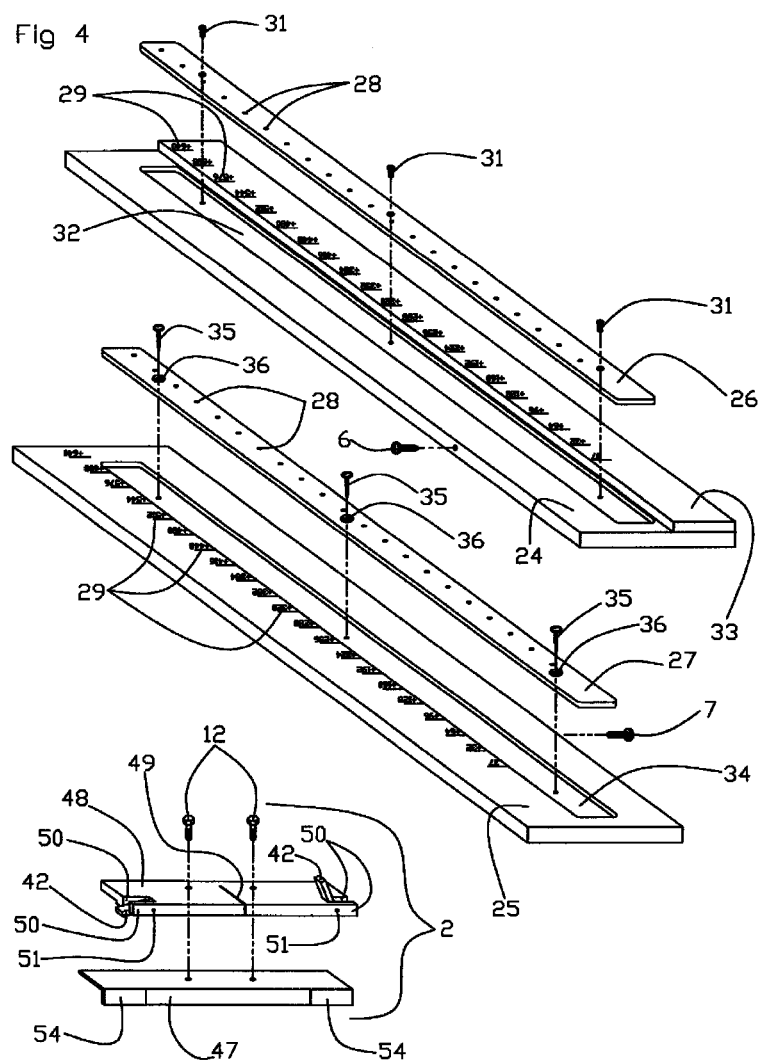

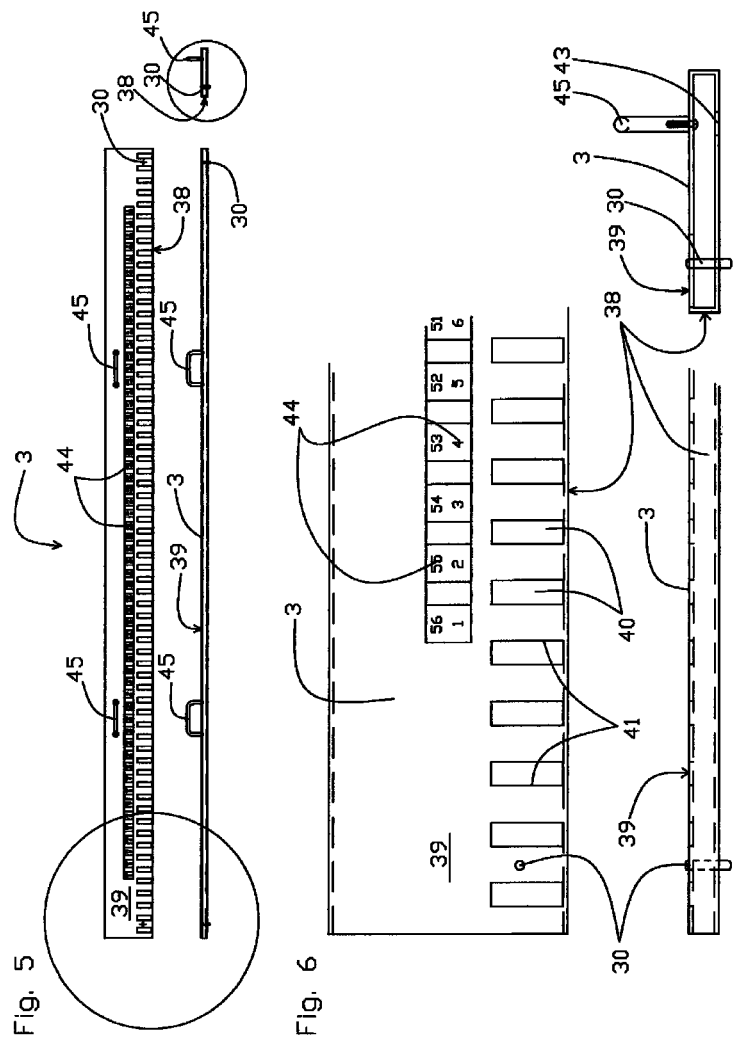

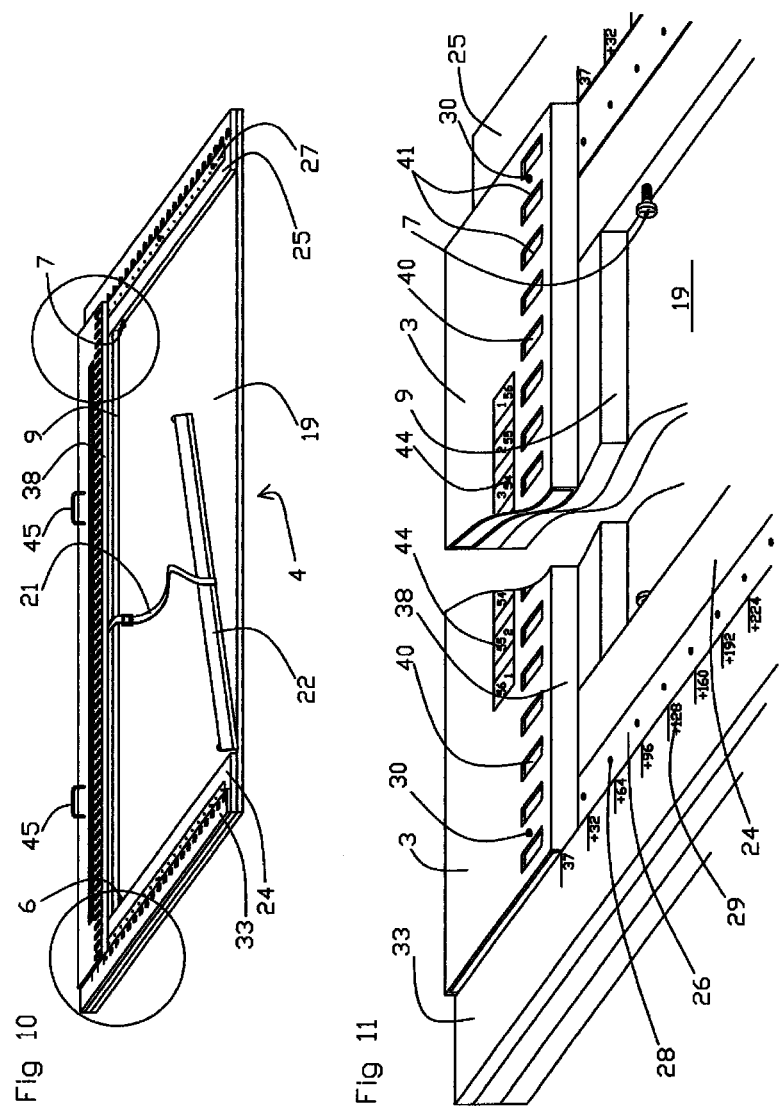

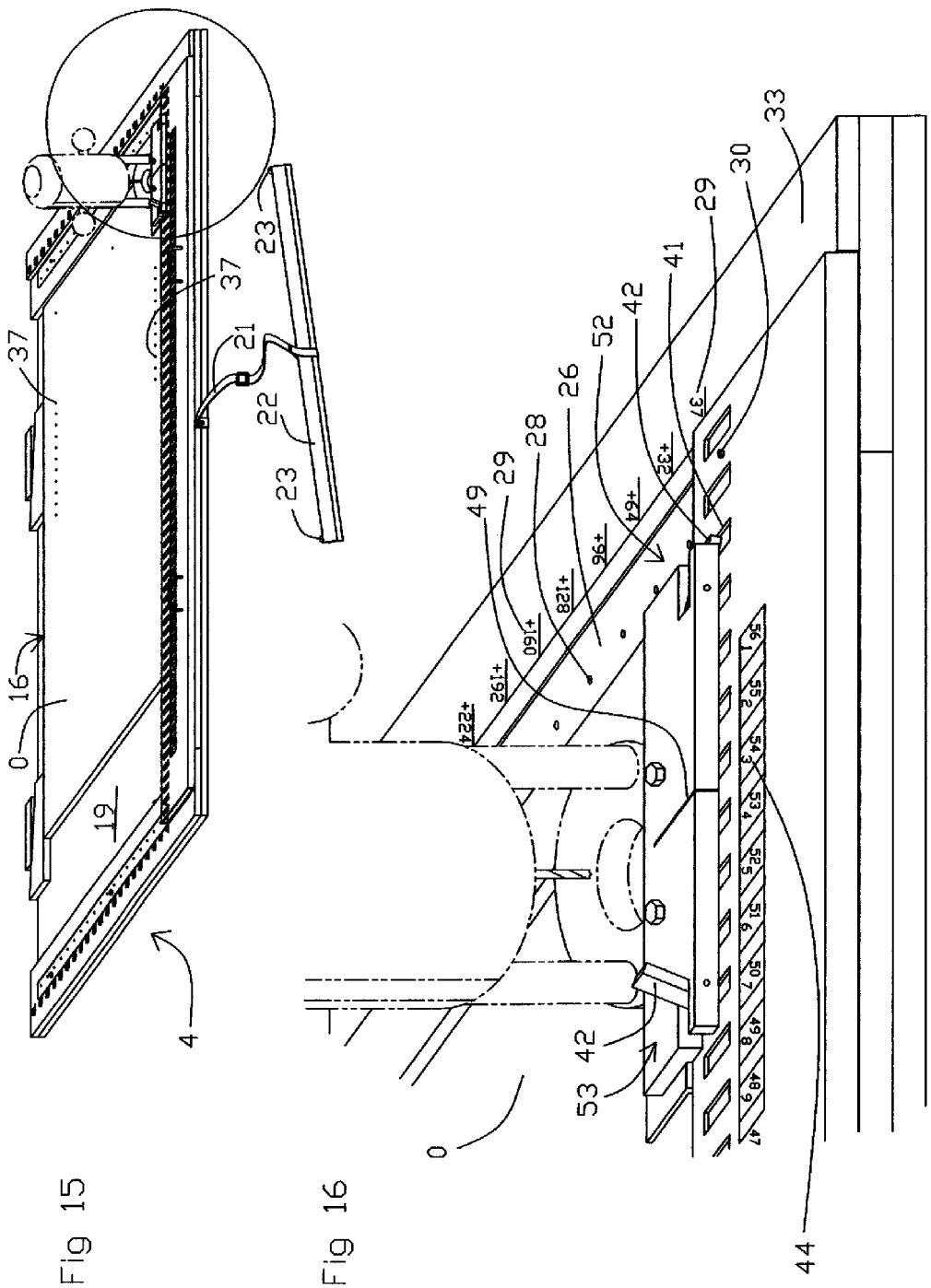

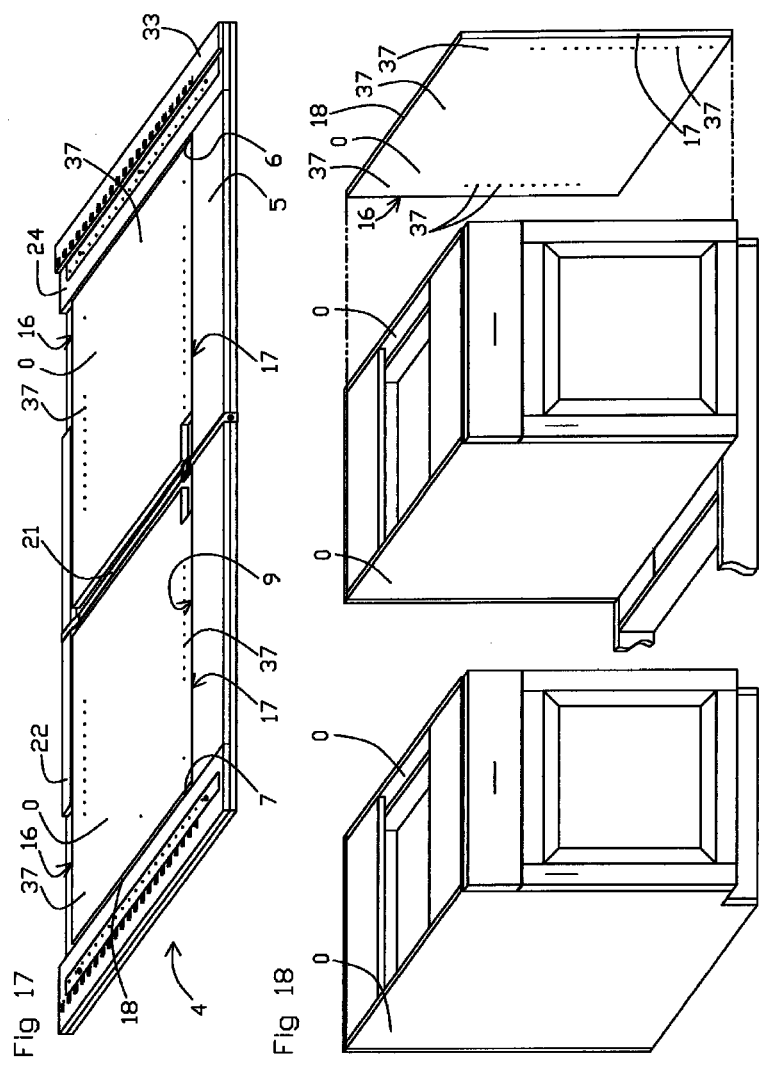

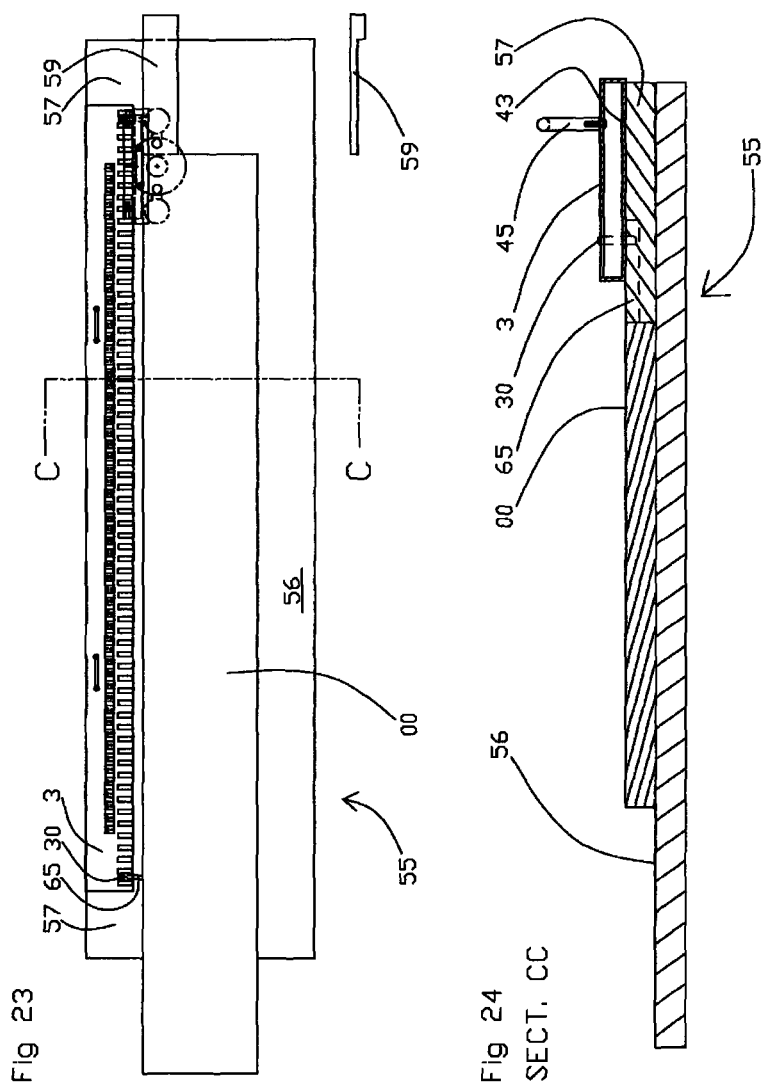

HOLE POSITIONING SYSTEM

FIELD OF THE INVENTION

This invention relates to an economical small shop system for drilling cabinet or book case side panels for the installation of hinge mounting plates, drawer slide components, and shelf supports. It's adaptable to other industrial applications where a hole pattern or an array of points is needed on an essentially flat surface.

CROSS REFERENCE TO RELATED INVENTIONS

Not applicable.

STATEMENT OF FEDERALLY SPONSORED RESEARCH/DEVELOPMENT

Not applicable.

NAMES OF PARTIES TO A JOINT RESEARCH AGREEMENT

Not applicable.

REFERENCE TO A "SEQUENCE LISTING"

Not applicable.

BACKGROUND OF THE INVENTION

Cabinets and furniture manufactured today in the U.S. for hospitals and medical facilities, business offices, laboratories, many other commercial entities, and increasingly residential kitchens, are often made in the frameless style. These cabinets are simply boxes made from flat panel material such as edge-banded melamine faced particleboard, high pressure laminate faced particle board, or from hardwood plywood. Doors and drawer fronts essentially hide the front edges of the cabinet boxes. No face frame is needed. Mounting plates for concealed hinges are attached directly to the inside of the cabinet side panels along with drawer slide hardware and adjustable shelf supports.

Much of the above mentioned hardware is designed to be mounted with special screws or pins which fit into 5 mm diameter holes. These holes are drilled in columns parallel to the front edge of the cabinet side panels and rows parallel to the top edge. The centerline of the first column of holes is typically at a standard distance of 37 mm from the front edge of the cabinet side panel with an additional column of holes drilled near the back of the cabinet at a multiple of 32 mm back from the first column for the rear most mounting screw in the drawer slide and or for the rear shelf support. Intermediate columns of holes are sometimes drilled, again at multiples of 32 mm, between the front and rear columns for additional drawer slide mounting screws. Within each column, holes are spaced at 32 mm or multiples of 32 mm above or below one another beginning at a standard distance from the top edge of the cabinet panel.

In larger cabinet shops or furniture factories these 5 mm hardware mounting holes are often drilled on large expensive multi spindle drill machines or on even more large and expensive computer controlled panel processing machines and point to point drilling machines. A great deal of floor space and capital investment are required. Smaller commercial cabinet shops and home workshops with limited space and budget have available to them a wide variety of templates, drill guides, and jigs used with hand drills or plunge routers. In addition, small multi spindle drill heads for use with drill presses are available to aid in drilling the holes used in cabinet construction.

Unfortunately these jigs, templates etc. are sometimes inaccurate in locating holes, slow to set up, often locate and drill only a small number of holes per set up, require substantial time resetting for subsequent columns or rows of holes. Some systems require considerable effort and accumulated time to lift a router off a template or a drill from a guide bushing then reinserting it for each hole to be drilled. With some systems it is necessary to measure and mark reference points or center lines on the panels. U.S. Pat. No. 6,524,033 B1 shows a complex system, wherein a bench, several templates, multiple registration pins etc. are required along with the router equipped with it's guide bushing. A system marketed by "Festool" as the LR32 hole drilling set uses a guide rail which gets clamped to the panel. It has adjustable gauging bars with slidable stops which register off the front edge of the panel to locate the first column of holes at 37 mm. Some calculations are required and readjustment of the slidable stops to reposition the guide rail from the back edge and reclamping so that a back column and or an intermediate column of holes can be drilled. The system uses a plunge router with attached guide plate which has a movable pin which drops into holes in the guide rail to hold the router in position while a hole is drilled. It is necessary to manually lift the registration pin from the hole in the guide rail then move the router forward while holding registration pin up until the next selected hole position is reached. Another patent, U.S. Pat. No. 5,056,966 uses a complex arrangement of rails clamping bars and gauges to position a drill guide bushing to locate a portable drill. Unfortunately portable drills tend to produce imperfect holes with chipped edges or torn veneer. U.S. Pat. No. 5,560,408 uses a clamp on template and a plunge router with a guide bushing to drill columns of holes for shelf supports but would not work well to drill holes at specific spacings to fit the screw holes in the front and back ends of drawer slides. U.S. Pat. No. 5,217,331 likewise designed to drill holes for shelf supports would not work well for drawer slide screws. Productivity issues and the appearance and precision of the holes are a real concern. Consider that a small kitchen with 12 to 15 cabinets would have 24 to 30 side panels requiring holes for hardware items that may include drawer slides, hinges, and shelf supports. The total could easily reach 1000 to 1500 holes. Drilling with an inefficient system requiring frequent resetting or repositioning of jigs or fixtures, and or the lifting of a plunge router or hand drill and realigning and reinserting of a bit or guide bushing into a template or drill guide for each hole would be extremely tedious.

Generally the systems described here as prior art are not best suited for the uniform high quality production drilling required in a small commercial shop.

SUMMARY OF THE INVENTION

The primary objective of this invention is providing small-shop cabinet manufacturers a fast economical and compact means of drilling cabinet panels. Greater precision and a faster rate can be achieved when drilling is done with this invention than when using prior art manual systems or with lower priced multi spindle drill equipment. The fixture and guide rail can be hung from or leaned against a wall for storage when not in use.

Holes are drilled accurately using a plunge router equipped with a router guide assembly having a guide face and left and right ratchet pawls. As the said guide face slides along a guide rail, either the left or right said ratchet pawl sequentially drops into notches in the guide rail which is itself registered parallel with an alignment fence by means of its fixed pins into any of 21 pairs of holes in column locating bars attached to a fixture. Hole positions are specified by referencing column numbers printed near column locating bars and row numbers printed on the guide rail. The router with its guide assembly is slid along the guide rail until a desired hole number is indicated by a pointer on the guide assembly at which time router movement is stopped and reversed briefly until the end of the ratchet pawl engages the corresponding notch in the guide rail and the hole is drilled. The router's sliding motion is resumed and additional holes are drilled in the same manner each time a desired hole number is indicated. Since all hole positions are predetermined, fixed, non adjustable with respect to the fixture, no set up or adjustment is required for drilling standard cabinet panels other than lifting the guide rail and dropping it into subsequent column positions.

In using this invention, two standard cabinet side panels are loaded onto the fixture, aligned, positioned, clamped, drilled, unclamped and unloaded. For an operator familiar with the equipment and having a list of numbered positions, this process takes about 1 min 15 sec for a 4 drawer base cabinet with two columns of 4 holes in each panel (16 holes total). It takes about 2 min for three columns of 4 holes in each panel (total 24 holes). It takes about 2 min 10 sec for a 1 drawer, 1 door, 1 adjustable shelf base cabinet (two columns, 44 holes total), and 3 min 10 sec for drilling all positions in two columns of holes (96 holes total). The term "standard cabinet panel", in this document, refers to panels 76 cm wide by 88 cm high or smaller being drilled for hardware installation as described above. Drilling of non standard panel sizes and non standard hole positions will be discussed in the detailed description of the invention.

The work holding fixture as drawn and described here is sized and configured to allow loading, aligning, positioning and securing both the left and right side panels of a typical wall hung or counter base cabinet (panel size 76 cm×90 cm×1.905 cm or less), at the same time, and securing them in place with an integral resilient clamping means. If the panels have a long dimension greater than 90 cm but less than 182 cm, one panel, either left or right, can be loaded and secured by alternate clamping means such as by fixed tabs and wedges as shown, or by any other suitable means, and then drilled.

BRIEF DESCRIPTION OF THE DRAWINGS

The following series of drawings are either orthographic projections or cavalier projections showing the invention and its use. In order to more clearly show the numbering system and the operation of the router guide assembly many of the drawings are views of components from the alternate working position or back of the fixture. FIGS. 1 through 4 and 12 through 17 are views from the alternate position.

FIG. 1 is a cavalier projection showing the complete system ready to be loaded with one or two panels and used.

FIG. 2 is a partial orthographic projection showing details of the router guide assembly.

FIG. 3 shows the invention in kit form as it might be marketed and shipped where-of the purchaser would assemble the fixture supplying his own plywood for the base.

FIG. 4 shows details of the left and right column locating bars and supports and additional detail on the router guide assembly.

FIG. 5 is a partial orthographic projection of the guide rail. Circles indicate areas to be shown in enlarged details in the following drawing.

FIG. 6 shows details of the guide rail in the areas circled in previous drawing.

FIG. 10 shows the fixture with guide rail. Circles indicate areas shown in enlarged details in the following drawing.

FIG. 11 shows guide rail registered in the 37 mm column position as well as additional detail.

FIG. 12 shows the complete system with router in drilling position, including two cabinet panels loaded and clamped.

FIG. 13 shows the same drilling task as in previous drawing, except that guide rail set to drill an intermediate column of holes. Circle indicates area in enlarged detail in the following drawing.

FIG. 14 shows the guide rail registered in the (37+352) mm column position from the front edge of the panel. The router guide assembly is shown with a ratchet pawl engaging the edge of a detent and the pointer indicating the #7 row position from the top of the panel.

FIG. 15 shows an over size panel loaded and clamped using a home built wedge system. The circle indicates the area enlarged in the following drawing.

FIG. 16 shows guide rail in the 37 mm column position and the router in the #3 row position at the opposite end of the fixture from that shown in FIG. 12.

FIG. 17 shows two panels drilled as could be used in the example to the left in the following drawing.

FIG. 18 shows two examples of frameless cabinet types. The second cabinet illustrated is of the type having a separate toe kick base. The illustration to the right would be of a typical right end panel for that second cabinet.

FIG. 23 shows a home shop built fixture permitting use of the guide rail and router with guide assembly, of the preferred or shortened embodiment, to drill unusually long panels.

FIG. 24 is a section view of the home shop built fixture of FIG. 23 showing a notch in the fence to loosely accommodate the registration pins of the guide rail.

DETAILED DESCRIPTION OF THE INVENTION

Figure 1:
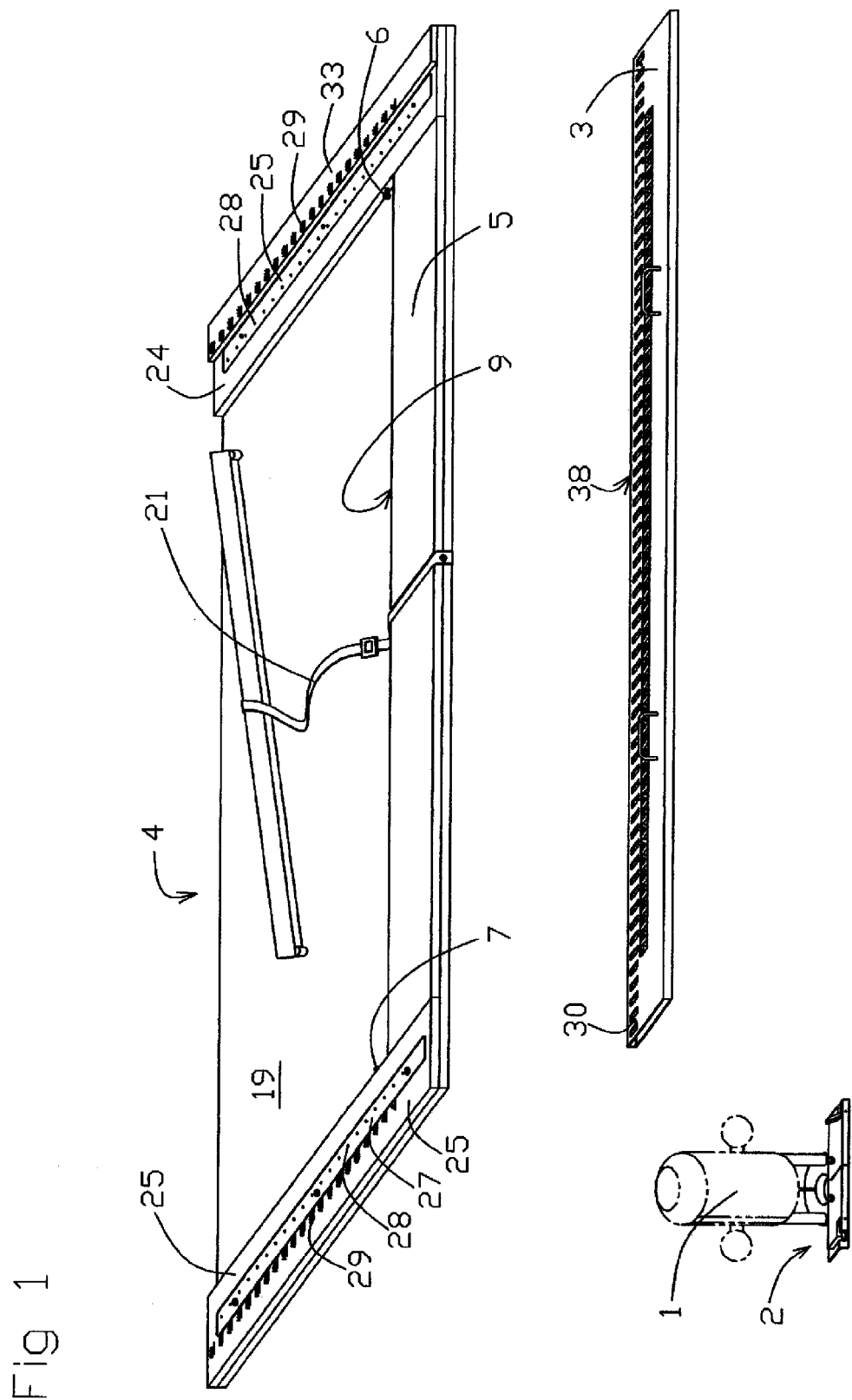
Figure 2:
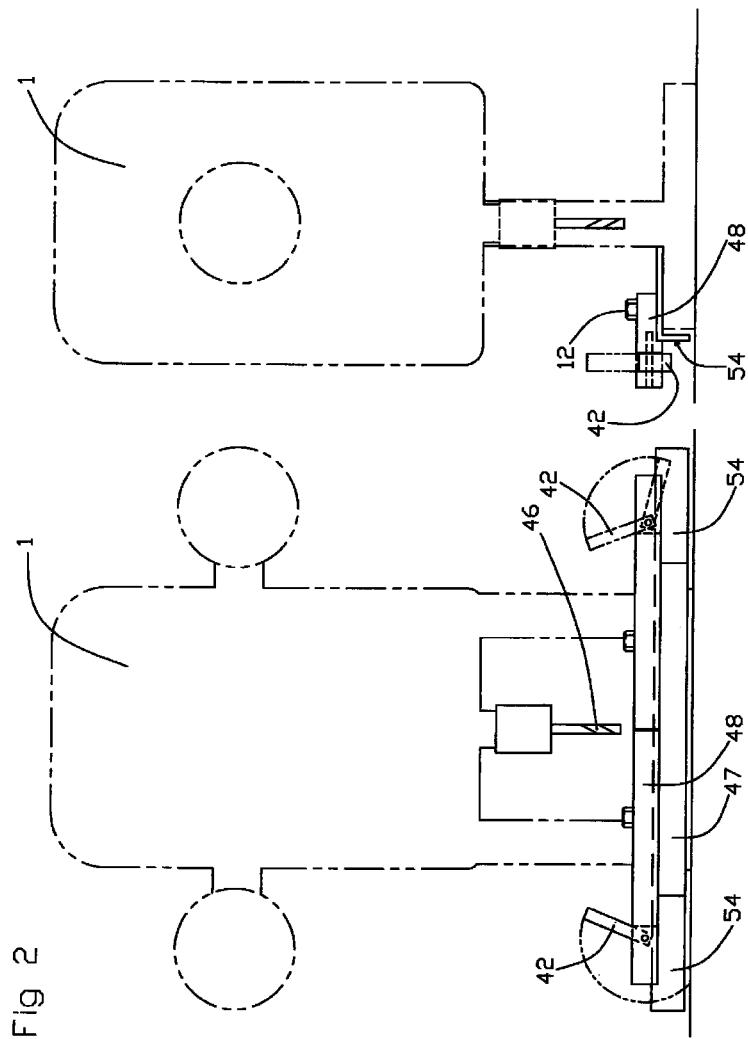

Note: The first 4 paragraphs following this note, with only a few reference numbers, provide additional familiarization with the invention while paragraph five begins a detailed description of components, manufacture, and sequence of operations for the invention.

The invention described here as the "preferred embodiment" is sized and laid out in a way that is believed by the inventor to be its most productive configuration for use in cabinet manufacturing. It could be produced in ways that would be less costly to build. Some of those ways will be discussed later in this section.

A plunge router 1 positioned by means of a router guide assembly 2 in conjunction with a guide rail 3 registered to a work holding fixture 4 is used to drill holes in work pieces which in most cases would be cabinet panels. Several standard panel (work piece) sizes and configurations are shown in the various drawing figures, and since all standard panels can be drilled in the manner described below, no distinction between panel types will be made and all will be labeled 0. Hole locations can be selected from within an array of potential locations defined by perpendicular columns and rows spaced at 32 mm apart. The first column of potential hole locations is 37 mm from the front edge of a panel aligned against a fence 5 with the first hole in each column at 32 mm from the top edge of the panel. The guide rail 3 locates a maximum of 56 holes per column while the fixture 4 provides up to 21 column positions for a total of 1176 holes from either end stop. 6,7 These locations are fixed and nonadjustable with respect to the fixture 4 and are specified through use of a column and row numbering system. When a hole pattern is created by drilling selected holes into a panel 0 which is aligned against the fence 5 and located against a stop 6,7 at one end of the fixture, a minor image of that pattern is easily created in a panel aligned against the fence and located against the stop at the opposite end of the fixture by simply matching hole numbers drilled on the left to hole numbers drilled on the right. Adjustment of column and row positions with respect to a panel 0 and it's edges is accomplished through use of a spacer 8 placed between an edge of the panel and the face 9 of the alignment fence 5 and or a spacer 10 placed between an end of the panel and the positioning face of an end stop. The top surfaces of panels 0 must be flush with the top surfaces of the alignment fence 5 and of the left and right column locating bar supports 24,25 so if it is desired to drill thinner work pieces, it will be necessary to use spacers 11 under the panels to raise them to the required position. Any spacers 8,10,11 needed can be temporarily set in position or secured semi-permanently by screws or adhesive.

The router guide assembly 2 as drawn attaches directly to a preferred model of plunge router 1 by use of bolts 12 supplied with the router and can be fitted to other routers through use of adapter plates etc. Neither the preferred router nor other plunge routers with required adapter plates etc. are considered part of this invention.

Throughout this disclosure, the terms "left", "right", and "front" refer to relative directions and to locations on or parts of the fixture as viewed by an operator 13 who is working in the primary operating position 14 in front of the fixture. Several of the drawing figures show the system viewed from the alternate operating position 15 (back of the fixture) consequently left and right components appear reversed in these drawings. Some operators 13 may choose to work in the alternate operating position 15, in back of the fixture, for some of the drilling because this can reduce the amount of reaching required especially when drilling in the 37 mm column. When panels are placed onto the fixture, their back edges 16 would typically be toward an operator 13 in the primary operating position 14, while the panel front edges 17 would be against the "front" working face 9 of the alignment fence 5 and their top edges 18 would be pressed against left or right end stops 6,7. Cabinet makers skilled in the art would doubtless devise many custom procedures for use of the basic system components.

The invention consists of a fixture 4 which could be made primarily from high grade plywood finished with plastic laminate. The fixture would typically be clamped to a workbench, set on saw horses, or could be equipped with its own leg structure. The fixture 4 has a dual work piece supporting surface 19 and a dual work piece alignment fence 5 with a working face 9 that forms a boundary to the work supporting surface 19. The work piece alignment fence 5 which could be made from 19 mm plywood, has a groove 20 in the center of the top surface to allow the attached adjustable straps 21 of the resilient clamping device to pass under the guide rail 3 without interference. A clamping jaw 22 with pressure pads 23 at each end concentrates the clamping force of the resilient member 21 at the approximate centers of each panel 0 urging them against the face 9 of the alignment fence 5. The working face 9 of the work piece alignment fence 5 could be finished with a plastic laminate. The fixture 4 has adjustable left and right work positioning stops 6,7 threaded into left and right column locating bar supports 24,25. Column locating bar supports 24,25 which could be made from 19 mm plywood, hold column locating bars 26,27. The column locating bars 26,27 each have matching series of holes 28 and corresponding column numbers 29 spaced 32 mm apart center to center for receiving the registration pins 30 fixed to the left and right ends of the guide rail 3. Column locating bars 26,27 could be made from 6 mm by 50 mm aluminum extrusions. The column locating bars 26,27 are secured to the fixture such that when first the left and then the right pins 30 of the guide rail are engaged into matched numbered holes 28 in the left and right column locating bars 26,27, the guide rail 3 will be held parallel to the working face 9 of the work piece alignment fence 5. The left column locating bar 26 is fixed securely, by flat-head countersunk screws 31, in a snug fitting recess 32 in the left column locating bar support 24. A raised end stop fence 33 is disposed along the left edge of the left column locating bar support 24 to aid in inserting the left registration pin 30 of the guide rail 3 into a numbered column location. The right column locating bar 27 is held movably in an over width recess 34 in the right column locating bar support 25 by washer head screws 35 passing through over-sized counter bored holes 36 so it is free to move slightly left or right to accommodate slight changes in relative lengths of the fixture 4 and the guide rail 3 due to changes in temperature and humidity. When necessary, the work positioning stop 7 corresponding to the movable column locating bar 27 can be re-calibrated to maintain its 32 mm distance from the first row of hole centers. Registration pins 30 in the guide rail 3 have rounded bottom ends and the column locating holes 28 in the column locating bars 26,27 have slightly chamfered top openings thus permitting self alignment of column locating bars 26,27 and pins 30. The numbering system indicating column positions 29 is based on the first column near and parallel to the front edge 17 of the cabinet panel 0 being at 37 mm from said front edge, with subsequent columns being at multiples of 32 mm back from that first column. This numbering system 29 facilitates drilling of hardware mounting screw holes 37 according to specifications furnished by many drawer slide and hinge manufacturers.

The guide rail component 3 of the invention can be made from a length of light weight aluminum extrusion having a wall thickness of about 2 mm to 3 mm, an overall thickness of the extrusion of approximately 1.5 cm, a width of approximately 12.5 cm, and a length of approx. 209 cm. The guide rail 3 has a front linear guiding face 38 which could be finished with a low friction overlay such as a polyester self adhesive edge-banding tape. It has a top face 39 into which has been cut a series of rectangular openings 40 or indentations 40 spaced 32 mm center to center. Those edges 41 of the notches 40 that are perpendicular to the linear guiding face 38 will engage with ratchet pawls 42 attached at the left and right ends of the separate router guide assembly 2. The top face 39 of the guide rail 3 also has a numbering system 44 which indicates the number of 32 mm increments that a row position is located from its corresponding left or right work positioning stop 6,7. The left and right ends of the guide rail are fitted with fixed pins 30 which protrude about 6 mm through the bottom of the guide rail 3 and fit snugly but slidably into the column locating holes 28 in the column locating bars. The guide rail 3 has two handles 45 which are screw attached through holes 43 in the bottom of the guide rail for lifting said guide rail 3 and repositioning it into the various numbered column positions 28,29.

The router guide assembly 2 precisely positions a plunge router 1 fitted with a 5 mm clean cutting carbide tipped spur bit 46 so that it will drill holes 37 in columns as described above. The router guide assembly 2 has a guide face 47 with mounting component about 30.5 cm long by about 1.9 cm high and can be fabricated from a 1.9 cm by 3.8 cm by 0.32 cm aluminum angle. There is also a phenolic component 48 approximately 1.2 cm by 5 cm by 28 cm which has a row number pointer 49, and which is notched at the ends to form ears 50 which are drilled to hold ratchet pawls 42 by means of pivot pins 51. These ratchet pawls 42 are configured so that if the system operator 13 is moving the router 1 from the left end of the fixture 4 toward the right, the left ratchet pawl 42 can be placed in the gravity urged down (engagement) position 52 and the right ratchet pawl can be placed in the up gravity held over center (disengaged) position 53. Working in this way the operator 13 may choose to drill any or all of the numbered holes in the selected column of holes in a panel 0 which has been positioned against the left end stop 6. Holes are drilled in a panel 0 aligned against the fence 5 and positioned against the right end stop 7 in a similar manner by reversing positions of the ratchet pawls 42 and the directions of motion. The guide face 47 of the router guide assembly 2 may be equipped with low friction slide pads 54, at each end, which would serve to move the contact points toward the ends of the guide face 47 thus improving stability of the guide face 47 as it slides along the linear face 38 of the guide rail 3. Hole positions are located by maintaining the slide pads 54 of the guide face 47 of the router guide assembly 2 slidingly against the linear guiding face 38 of the guide rail 3 while moving the router 1 and said assembly continuously in the direction of ascending row numbers 44 from either end of the fixture 4. The ratchet pawl 42 which is in the down position 52 is allowed to drop into and then withdraw from successive notches 40 in the guide rail 3 until a selected row number 44 is indicated by the pointer 49 at which time the router 1 and guide assembly 2 are stopped from moving forward and then are moved slightly backward until the end of the engaged 52 ratchet pawl 42 bumps an edge 41 of the corresponding notch 40, whereupon the router 1 can be plunged thus drilling a hole 37.

The guide rail 3,63 and router 1 with guide assembly 2 of the preferred or subsequent embodiments can be used to drill unusually long cabinet or book case panels 00 by employing a home shop built fixture 55 with a work supporting surface 56 and a fence 57 having notches 65 for pins 30. The guide rail 3,63 would be centered left to right on the fixture 55 then clamped or screwed down aligned parallel with the fence 57 and positioned so as to drill a column of holes at 37 mm or other desired distance from the edge of a long panel 00 when the router 1 with guide assembly 2 are used in the same manner as with the fixture 4 of the preferred embodiment. A panel can be loaded onto the work supporting surface 56 positioned from one end by use of a home shop built end gauge 59 and clamped by any suitable means. If a column of holes longer than what is possible with the guide rail 3,63 is desired, the operator could drill the maximum number of holes provided for by the guide rail 3,63, leave the router 1 in the plunged down position, unclamp the panel 00, lift the engaged ratchet pawl 42, 52, slide the panel 00 and router (with bit remaining engaged in the last hole drilled) back to the number 1 position marked on the guide rail, engage the ratchet pawl 42,52, re-clamp the panel 00, and continue drilling. To drill a second column of holes, the panel could be rotated 180 degrees about a vertical axis then placed back on the fixture, positioned from the opposite end of the fixture using the end gauge 59, then clamped and drilled as above.

In a second embodiment of the invention (not shown), the configuration would be identical to that of the preferred embodiment except that the fixture including the work supporting surface and the alignment fence would be reduced in length (left to right) to a size which would hold 2 panels of a maximum size of 76 cm×78 cm. For this version, two shorter guide rails with 48 row positions could be cut from one stock length (368 cm) of aluminum extrusion thus reducing cost. This shorter fixture and guide rail configuration would still accommodate the standard size panels for cabinets built in a typical frameless style wherein a separate toe kick base is employed and the panels are not more than 78 cm high. The router guide assembly, the column locating bars and their supports, the end stops and the resilient clamping means would all remain unchanged, as would the operating procedure.

In yet another embodiment of this invention, the fixture including the work supporting surface 61 and the alignment fence 62 would be reduced in length to a size which would hold only one (76 cm×80 cm) panel 0. For this embodiment a manufacturer could cut 3 guide rails 63 from one stock 12 foot length of aluminum extrusion and at least two work holding fixtures 61 from one stock sheet of plywood, again reducing cost and space requirements. While the resilient clamping device would probably be eliminated, the column locating bars 26,27 and their supports 24,25, the work piece end stops 6,7, and the router 1 and guide assembly 2 would remain the same. The method of operation would change somewhat in that only one left 0 or one right panel 0 would be loaded, aligned against the face of the fence 62, positioned against a left or right end stop 6,7, then clamped by alternate means. The guide rail would be registered to the column locating bars 26,27, and the router 1 would be placed and moved as with the preferred embodiment.

Figure 3:
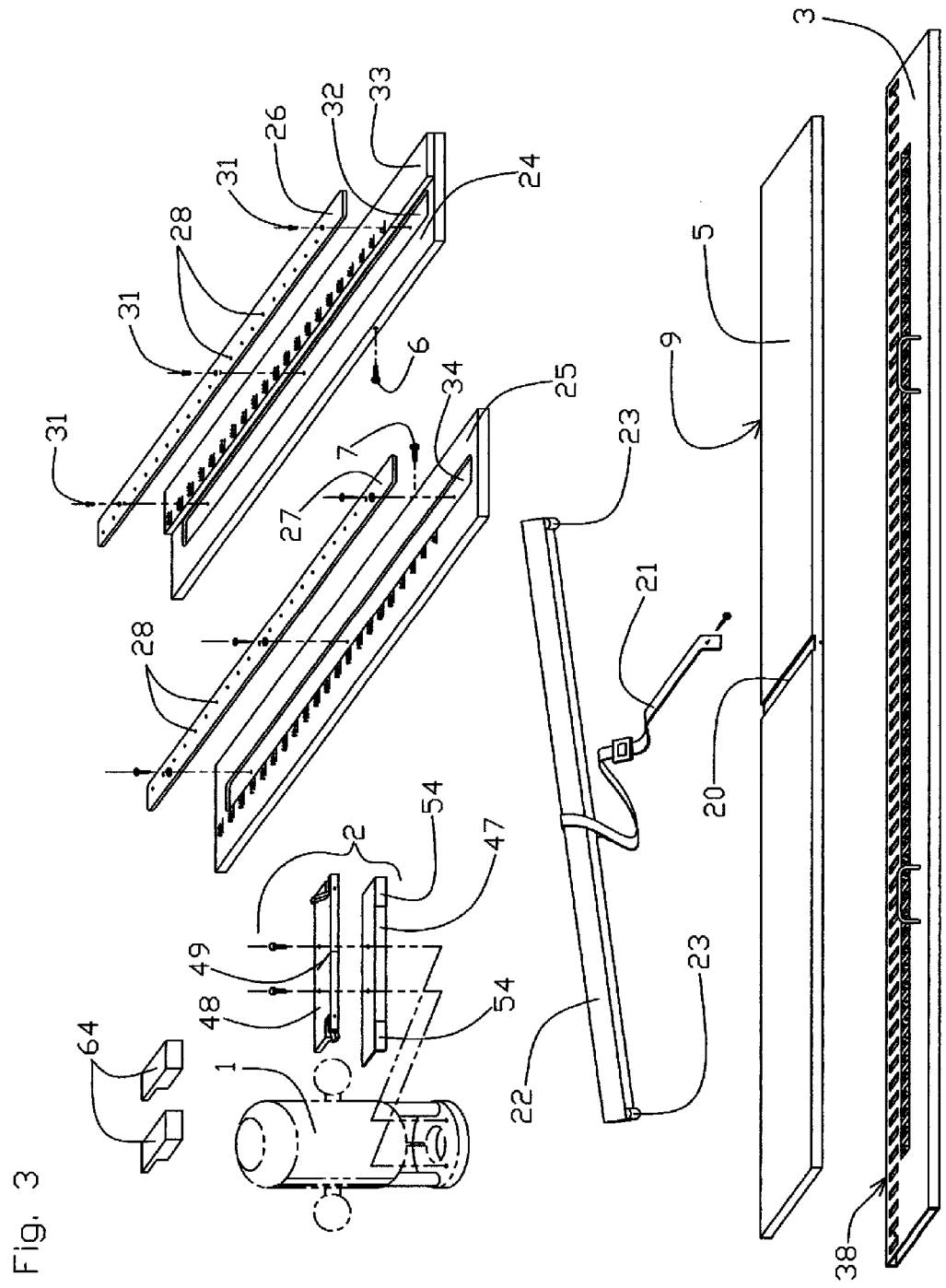
Figure 7:
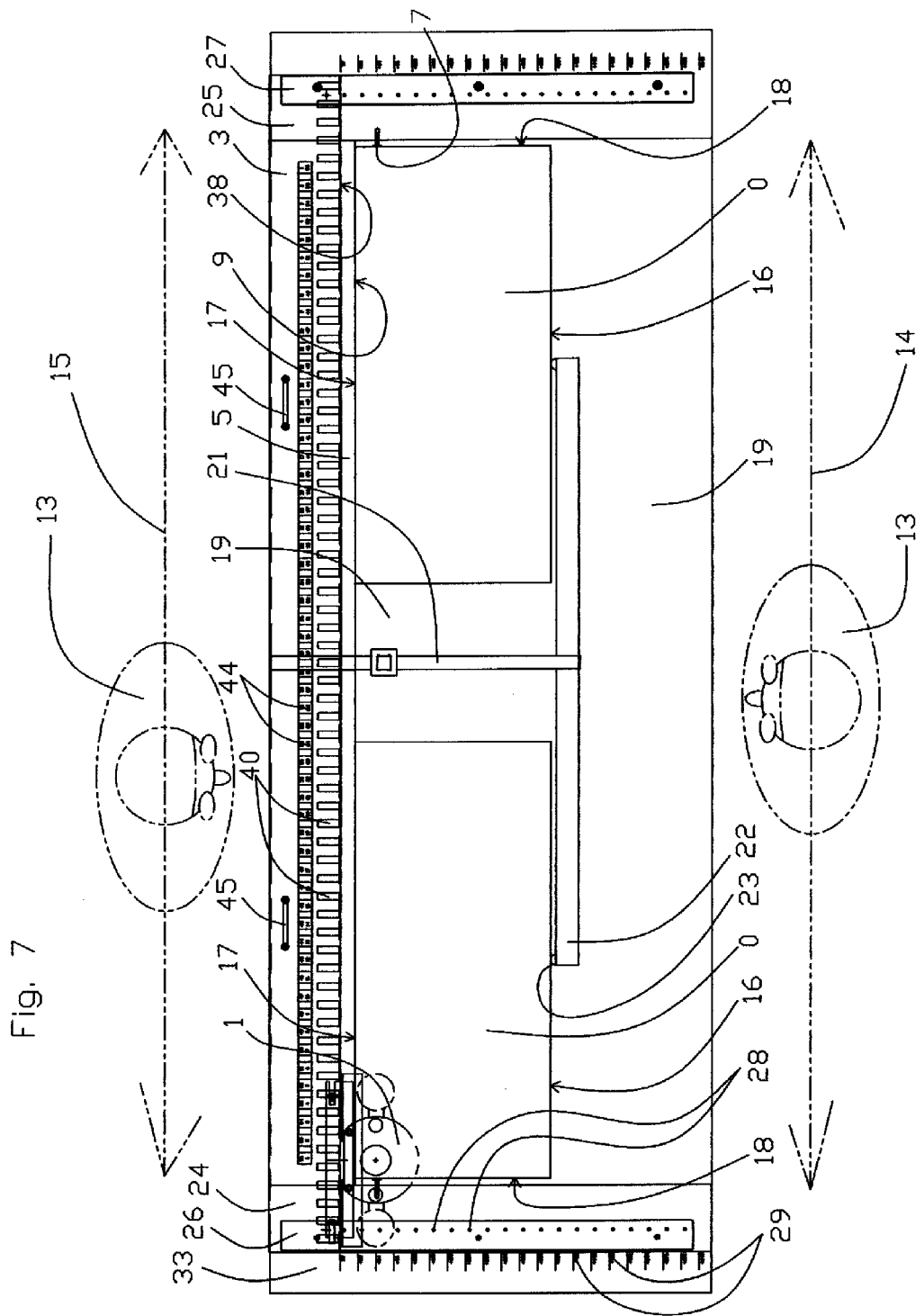
FIG. 7 shows the primary and alternate operating positions for the system. This figure also shows two panels loaded, clamped and ready to drill.
Figure 8:
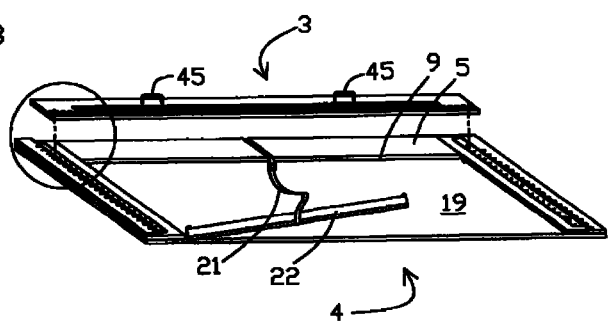
FIG. 8 shows complete fixture and guide rail. Circle indicates the area shown in detail in the following drawing.
Figure 9:
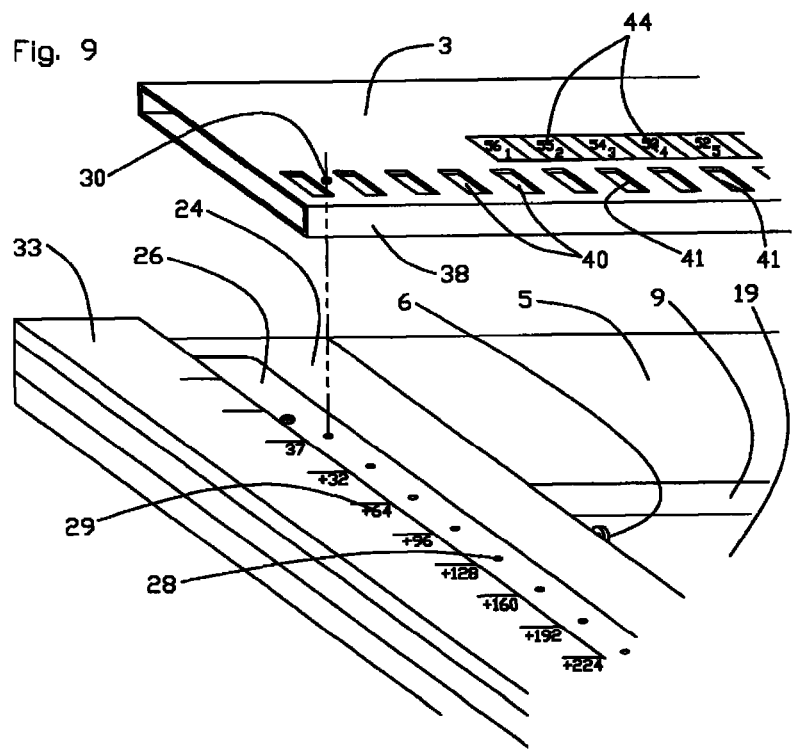
FIG. 9 shows registration of guide rail to column locating bar with additional detail.
Figure 12:
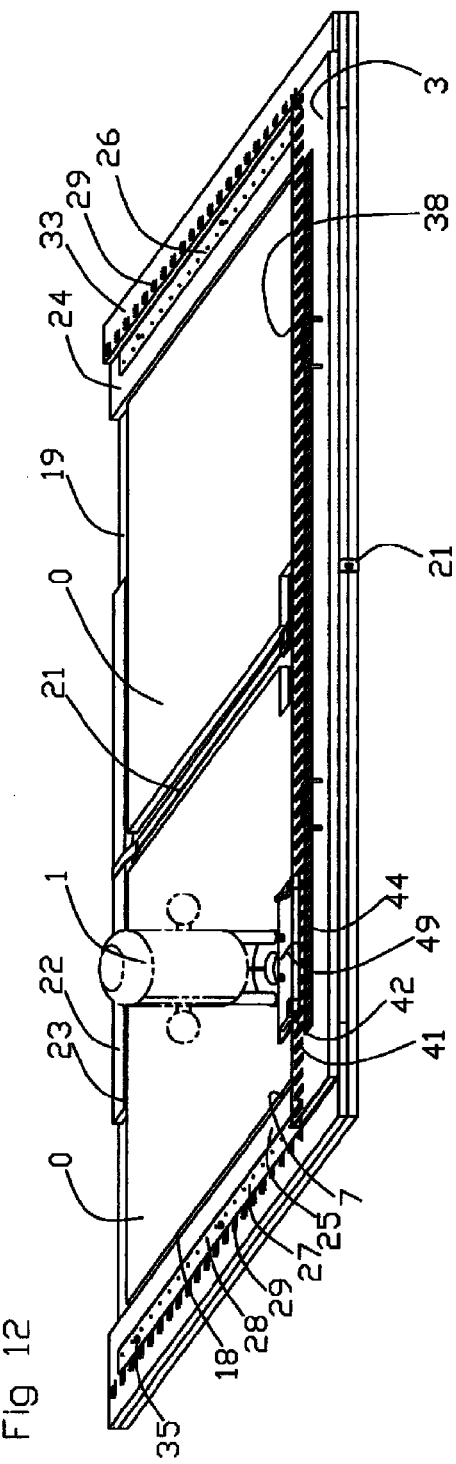
Figure 13:
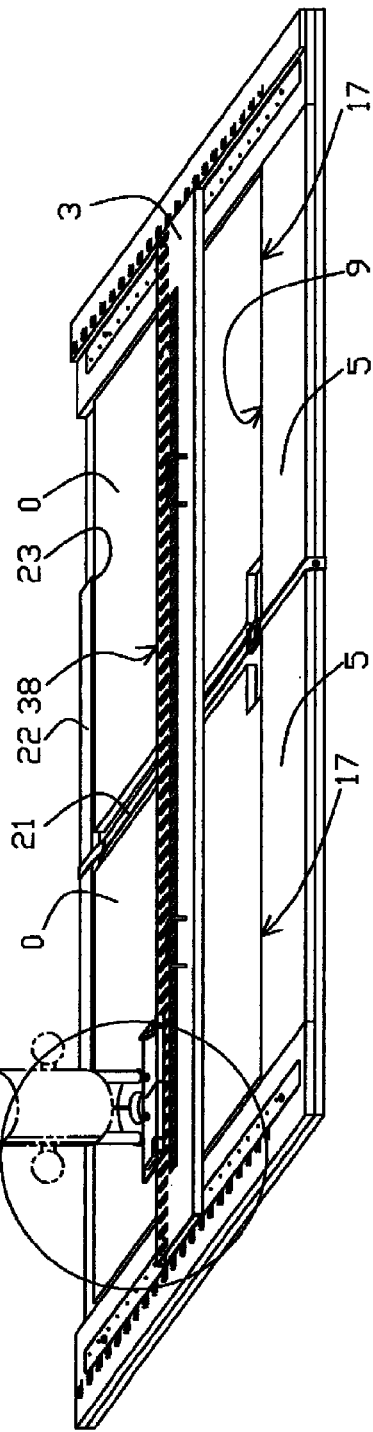
Figure 14:
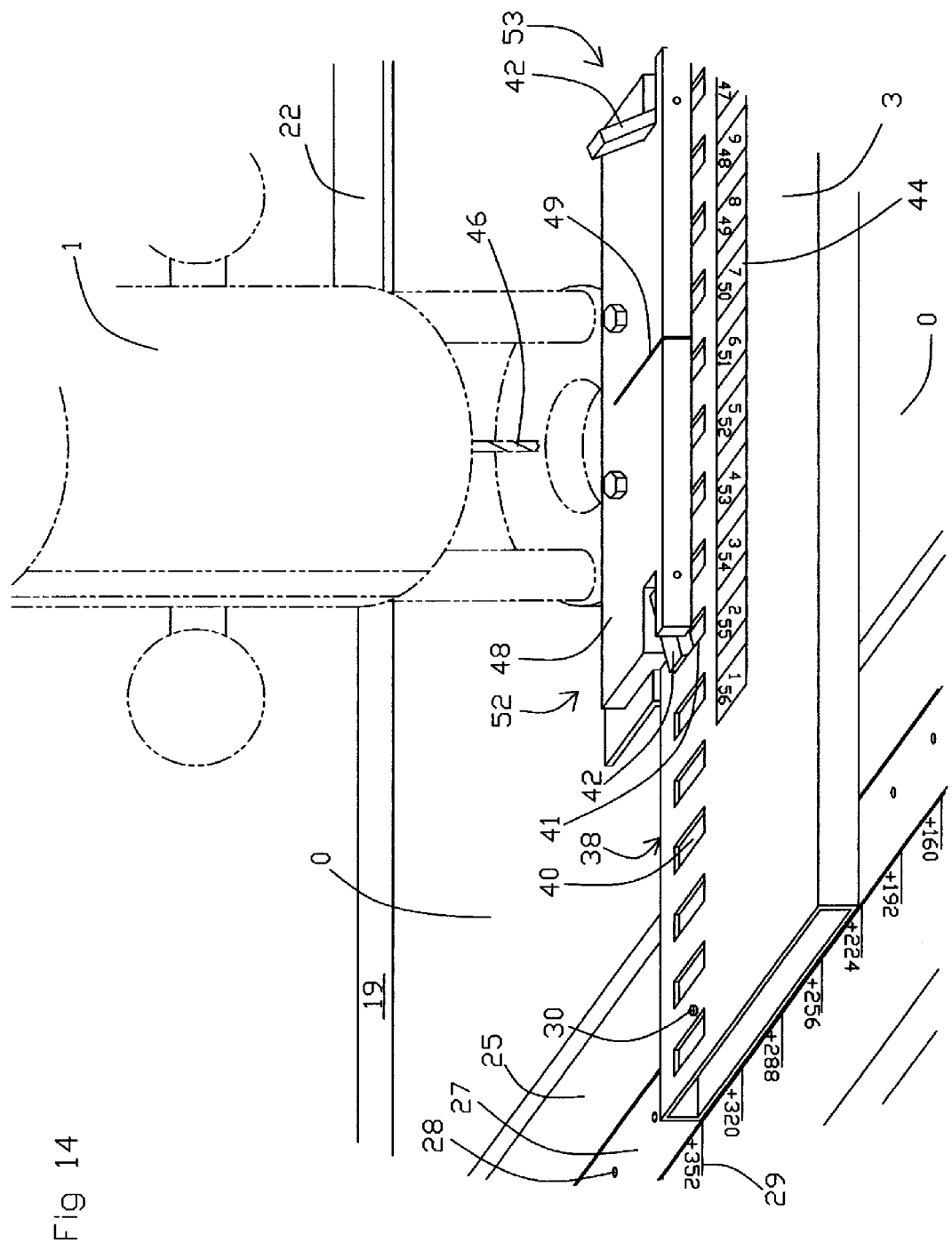
Figure 19:
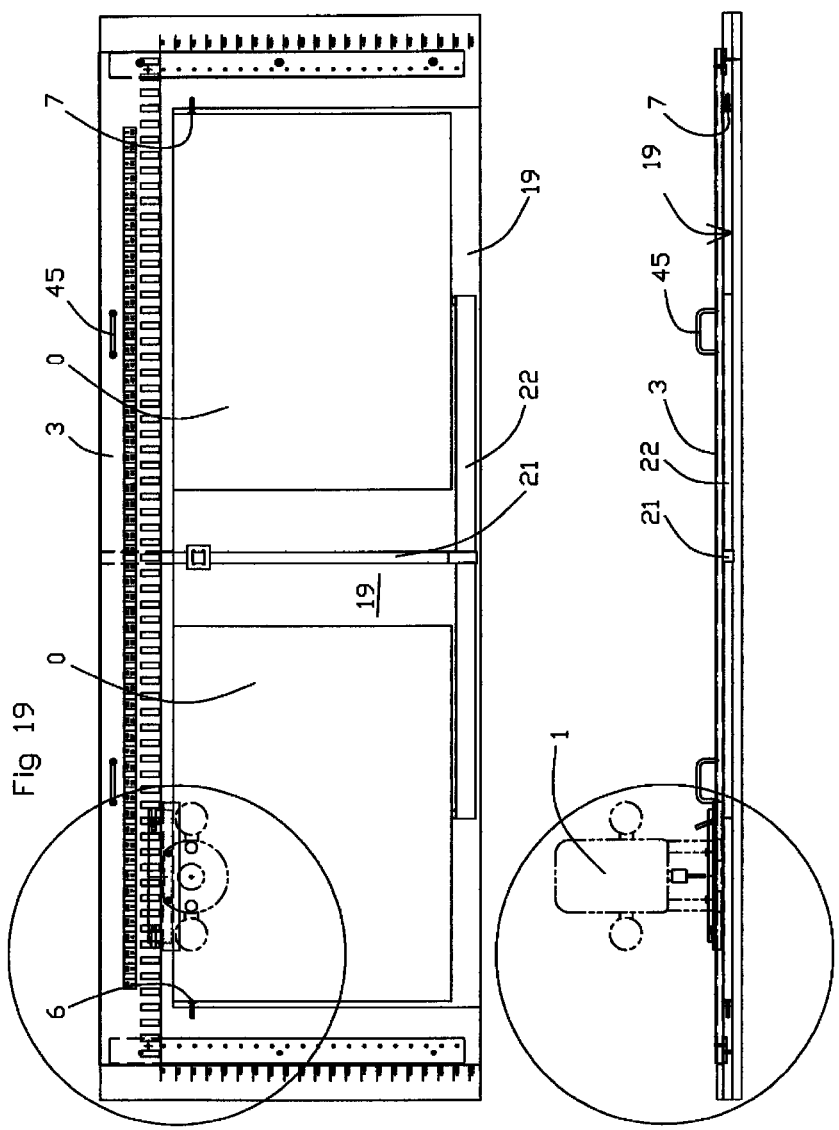
FIG. 19 shows the fixture loaded with panels of a size as illustrated at the right in the previous fig. Circles indicate areas enlarged in the following two drawings.
Figure 20:
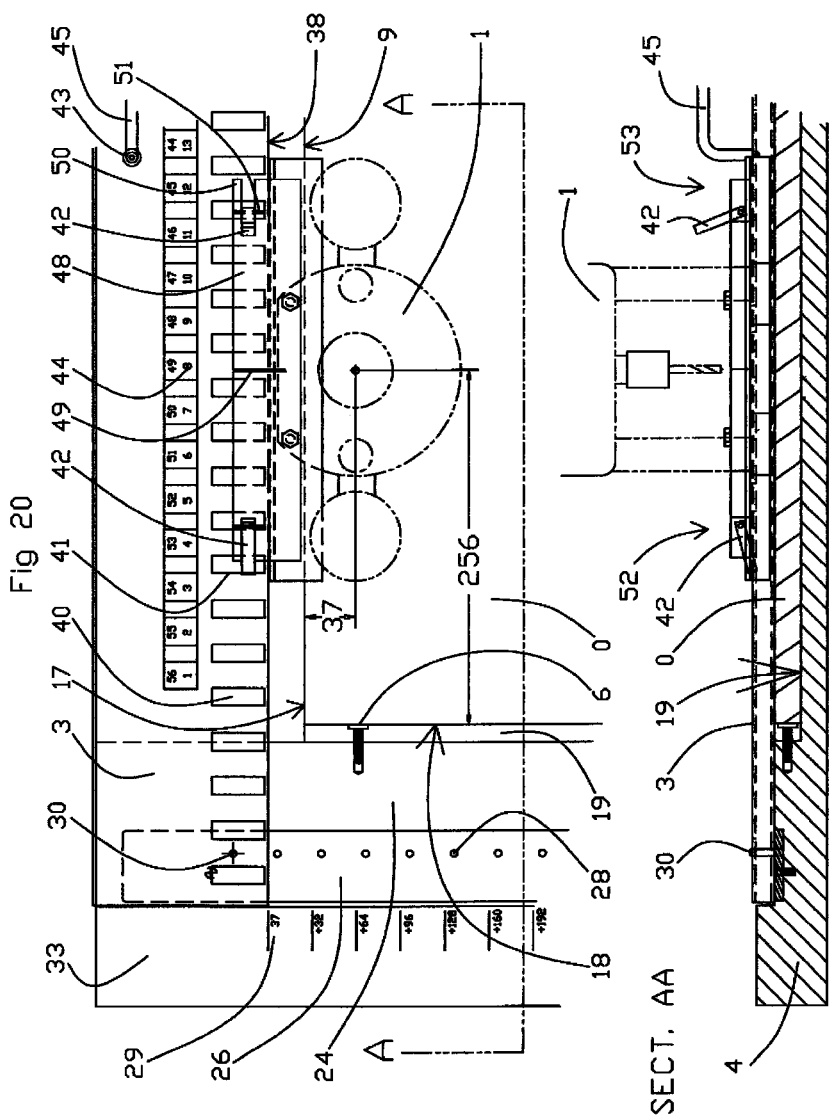
FIG. 20 shows the left back corner of fixture viewed from primary operating position. The guide rail is in the 37 mm position while the router is in the #8 row position. The assembled fixture screwed and glued together forms a single unit as shown by hatching in the section view.
Figure 21:
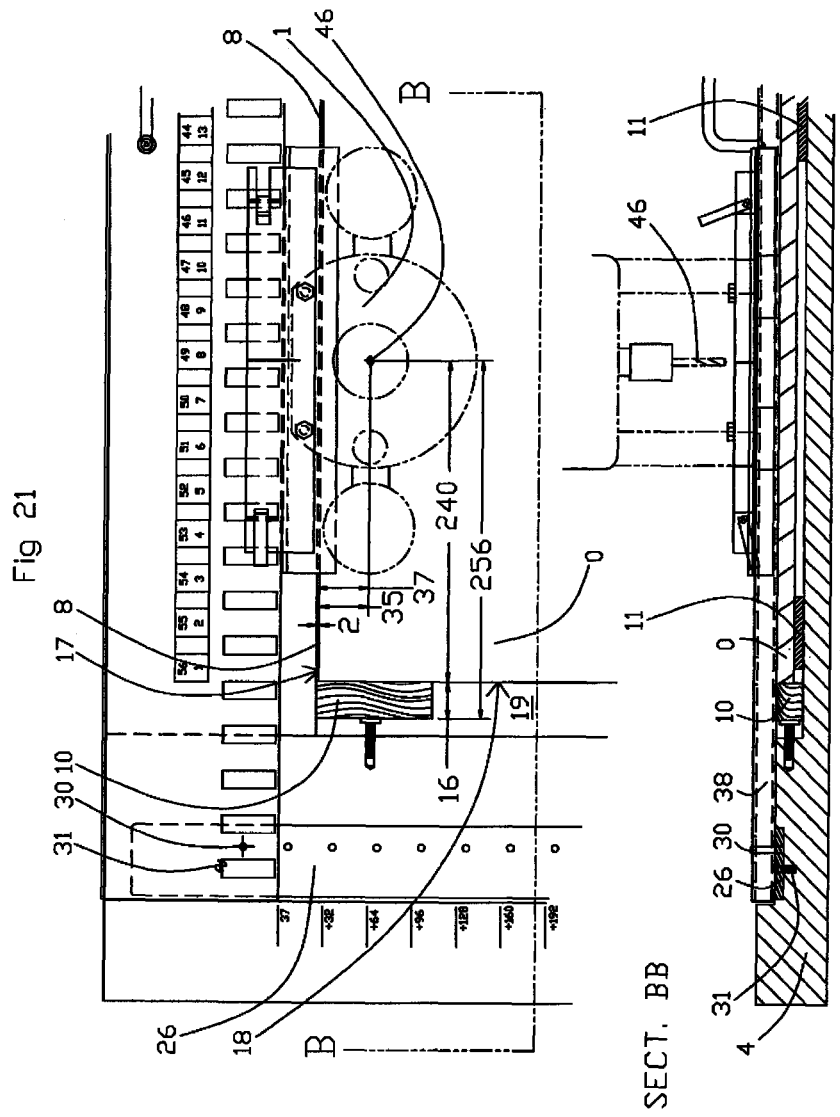
FIG. 21 shows use of spacer blocks to adjust hole positions on panel face. Compare measured locations to those of FIG. 20.
Figure 22:
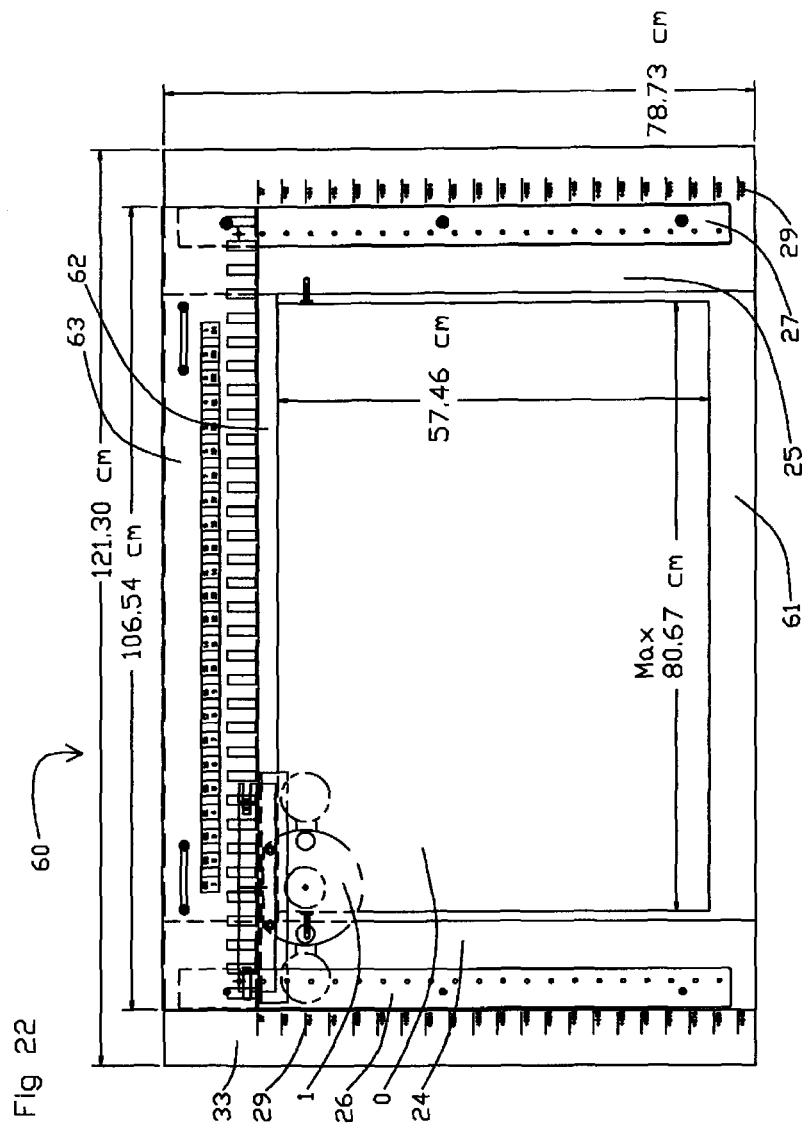
FIG. 22 Shows a shortened embodiment of the system wherein a single left or right panel is loaded and drilled. This configuration would save materials and shipping costs and would reduce shop space requirements.

As depicted in FIG. 3, any of the above 3 embodiments could be manufactured sold and shipped in kit form. The purchaser would need to provide and cut to size only the plywood base forming the work supporting surface and would use fasteners, alignment blocks 64, and detailed instructions included with the kit to assemble the fixture. The purchase price and shipping cost could be reduced and would allow the purchaser to expend some of his labor in lieu of out of pocket cash in the procurement of a working system.

Different materials and methods of construction might be chosen by a manufacturer of this invention for the various components of the system. The overall dimensions could be configured to more economically utilize stock sizes of goods. And by selecting the proper drill bit or tool, other sizes of holes could be drilled or center marks only could be indented into work pieces as required for other manufacturing processes. Obviously the system could be scaled up or down and the column and row positions could b configured to fit other manufacturing requirements while retaining the principle mode of operation as described above.

The invention claimed is:

1. A drilling system for quickly and accurately creating hole patterns in the faces of panel type workpieces and for creating mirror images of those hole patterns in additional workpieces, said drilling system comprising:

a work holding fixture having a workpiece supporting surface;

said work holding fixture also having a workpiece alignment fence disposed left to right and forming a boundary to the work supporting surface;

said work holding fixture also having adjustable left and right workpiece positioning stops;

said work holding fixture also having an integral resilient clamping device to secure 1 left and 1 right workpiece simultaneously;

said work holding fixture having a raised end stop disposed perpendicular to the workpiece alignment fence to aid in registering one end of a guide rail to the work holding fixture;

said work holding fixture also having an arrangement of holes which accept locating pins to releasably hold said guide rail parallel to the alignment fence in various numbered positions at specific distances from the alignment fence while keeping said guide rail centered between the left and right workpiece positioning stops;

said work holding fixture constructed so that the component containing the holes which accept the locating pin, at the end of the guide rail opposite the said raised end stop, is movable slightly left or right to accommodate slight changes in length of guide rail versus length of work holding fixture due to changes in temperature and humidity;

said guide rail having a linear guiding face;

said guide rail having left and right registration pins for positioning with respect to the work holding fixture;

said guide rail having also a surface into which has been cut a series of notches or detents with a certain spacing;

said guide rail having a dual numbering system corresponding to drillable hole positions gauged from the left and the right workpiece positioning stops of the work holding fixture;

said guide rail also having handles for lifting and reregistering into various numbered positions on the work holding fixture;

a router guide assembly having a guide face which, when slidably pressed against the linear guiding face of a guide rail that is registered to a work holding fixture, will restrict movements of an attached drilling or center marking machine to either the left or the right only;

said router guide assembly having a hole number pointer indicating numbered hole positions as marked on the guide rail;

said router guide assembly having opposed left and right ratchet pawls which when set one up one down will allow sustained movement in one direction only and which, when direction of that movement is reversed, will engage a detent in said guide rail thus fixing a hole position.

* * * * *